United States Patent
Liao

(10) Patent No.: US 10,968,929 B2
(45) Date of Patent: Apr. 6, 2021

(54) ANGLE FIXING CLAMP HOLDER WITH SIMPLE STEERING OPERATION

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 7 days.

(21) Appl. No.: 16/519,424

(22) Filed: Jul. 23, 2019

(65) Prior Publication Data

US 2021/0025415 A1 Jan. 28, 2021

(51) Int. Cl.
  *F16M 13/02* (2006.01)
  *F16B 2/06* (2006.01)
  *G10G 7/00* (2006.01)

(52) U.S. Cl.
  CPC .......... *F16B 2/065* (2013.01); *F16M 13/022* (2013.01); *G10G 7/00* (2013.01)

(58) Field of Classification Search
  CPC combination set(s) only.
  See application file for complete search history.

(56) References Cited

U.S. PATENT DOCUMENTS

| | | | |
|---|---|---|---|
| 5,017,038 A * | 5/1991 | Kurosaki | E04G 7/16 24/335 |
| 5,692,719 A | 12/1997 | Petersen | |
| 6,093,878 A * | 7/2000 | Hoshino | G10D 13/06 248/122.1 |
| 6,811,346 B2 * | 11/2004 | Liao | F16B 7/18 403/230 |
| 7,718,878 B2 | 5/2010 | May | |
| 9,251,771 B1 * | 2/2016 | Hsu | G10G 5/00 |
| 9,310,021 B2 | 4/2016 | Hennessey et al. | |
| 9,633,635 B2 * | 4/2017 | Liao | F16B 2/065 |
| 10,529,308 B1 * | 1/2020 | Liao | G10D 13/28 |
| 2010/0278585 A1 * | 11/2010 | Yi | G10D 13/28 403/103 |
| 2014/0026737 A1 * | 1/2014 | Sato | G10D 13/28 84/421 |
| 2019/0191686 A1 * | 6/2019 | Thomas | F16M 11/10 |

* cited by examiner

*Primary Examiner* — Monica E Millner
(74) *Attorney, Agent, or Firm* — Muncy, Geissler, Olds & Lowe, P.C.

(57) ABSTRACT

The invention comprises a first fixture group for clamping a first erecting rod, a second fixture group for clamping a second erecting rod, a fixed bolt and a compression spring, wherein the first fixture group comprises a first cylindrical portion with a first non-circular axisymmetric profile, the second fixture group comprises a second cylindrical portion sleeved with the first cylindrical portion, the second cylindrical portion comprises a second non-circular axisymmetric profile correspondingly sleeved with the first non-circular axisymmetric profile, and the first cylindrical portion axially slides relative to the second cylindrical portion to have a rotatable rotating position and a non-rotatable clamping position, the fixed bolt penetrates through the second cylindrical portion, the first cylindrical portion and the compression spring to be screwed with a nut, and the first cylindrical portion is pushed by the compression spring to move from the rotating position to the clamping position.

7 Claims, 6 Drawing Sheets

ANGLE FIXING CLAMP HOLDER WITH SIMPLE STEERING OPERATION

FIELD OF THE INVENTION

The invention relates to a supporting structure for a musical instrument, in particular to an angle fixing clamp holder with simple steering operation.

BACKGROUND OF THE INVENTION

Various instruments and music scores may need to be provided for performers to use during a performance. Various instruments and music scores required for playing, such as brass cymbal, drums and cowbells, may be fixed by the performers through implements disclosed in the patents including U.S. Pat. Nos. 7,718,878 B2, 9,633,635 B2, 5,692,719 and the like, such as monopods, holders and music stands, so that the instruments such as the brass cymbal, the drums and the cowbells as well as music scores can be placed beside the performers.

For the purpose of performance, the performers may also use a rotary joint as disclosed in the U.S. Pat. No. 9,310,021 B2. The rotary joint comprises a lower joint and an upper joint, wherein the upper and lower joints may be respectively connected to a erecting rod. After a rotary knob of the rotary joint is rotated and loosened, a relative angle between the lower joint and the upper joint may be changed by a user through rotation, so as to adjust a relative inclination angle between the two erecting rods, and meet the requirements during performance.

Although the rotary joint described above can be used by the user to adjust the relative inclination angle between the two erecting rods, the relative inclination angle can be adjusted after the rotary knob is rotated and loosened by the user. After the adjustment, the relative inclination angle between the two erecting rods can be fixed only by tightening the rotary knob again, resulting in quite a troublesome operation. Moreover, the rotary knob is fixed in a spiral way, so that the problem of loosening caused by vibration and screwing tooth breaking may exist. Obviously, the use requirement cannot be met.

SUMMARY OF THE INVENTION

Accordingly, a main object of the present invention is to disclose an angle fixing clamp holder with simple steering operation for a performer.

In order to achieve the above object, the present invention provides an angle fixing clamp holder with simple steering operation for clamping a first erecting rod and a second erecting rod. The angle fixing clamp holder comprises a first fixture group, a second fixture group, a fixed bolt and a compression spring, wherein the first fixture group comprises a first fixed block, a first movable block, a first locking assembly and a first cylindrical portion, the first locking assembly drives the first movable block to move towards the first fixed block, the first cylindrical portion is connected with the first fixed block, surfaces of the first fixed block and the first movable block facing to each other are respectively recessed inwards to form a first clamping groove through butt joint, and the first clamping groove clamps the first erecting rod.

The second fixture group comprises a second fixed block, a second movable block, a second locking assembly and a second cylindrical portion, wherein the second locking assembly drives the second movable block to move towards the second fixed block, the second cylindrical portion is connected with the second fixed block and sleeved with the first cylindrical portion, surfaces of the second fixed block and the second movable block facing to each other are respectively recessed inwards to form a second clamping groove through butt joint, and the second clamping groove clamps the second erecting rod. The first cylindrical portion axially slides relative to the second cylindrical portion to have a rotating position and a clamping position, the first cylindrical portion comprises a first non-circular axisymmetric profile, and the second cylindrical portion comprises a second non-circular axisymmetric profile correspondingly sleeved with the first non-circular axisymmetric profile, wherein when the first cylindrical portion is in the rotating position, the first non-circular axisymmetric profile is not in contact with the second non-circular axisymmetric profile, and the first cylindrical portion in the rotating position has an axial rotation degree of freedom relative to the second cylindrical portion; and when the first cylindrical portion is in the clamping position, the first non-circular axisymmetric profile clamps the second non-circular axisymmetric profile, and the first cylindrical portion in the clamping position does not have the axial rotation degree of freedom relative to the second cylindrical portion.

The fixed bolt penetrates through the first cylindrical portion and the second cylindrical portion, with one end of the fixed bolt clamped against the second cylindrical portion and the other end of the fixed bolt screwed with a nut, and an accommodating space is formed between the nut and the first cylindrical portion.

The compression spring is sleeved on the fixed bolt and positioned in the accommodating space, and the first cylindrical portion is pushed by the compression spring to move towards the second cylindrical portion so that the first cylindrical portion is able to move from the rotating position to the clamping position.

Accordingly, as a user wants to change a relative inclination angle between the first erecting rod and the second erecting rod, the user only needs to manually drive the first cylindrical portion to axially slide relative to the second cylindrical portion, so that the first cylindrical portion is able to compress the compression spring to be in the rotating position. Thus, the first cylindrical portion is provide with the axial rotation degree of freedom relative to the second cylindrical portion, namely the first fixture group and the second fixture group is able to rotate relative to each other, and then the relative inclination angle between the first erecting rod and the second erecting rod is changed, so as to meet the use requirement of simple steering operation.

DETAILED DESCRIPTION OF THE PREFERRED EMBODIMENTS

Figure 1:
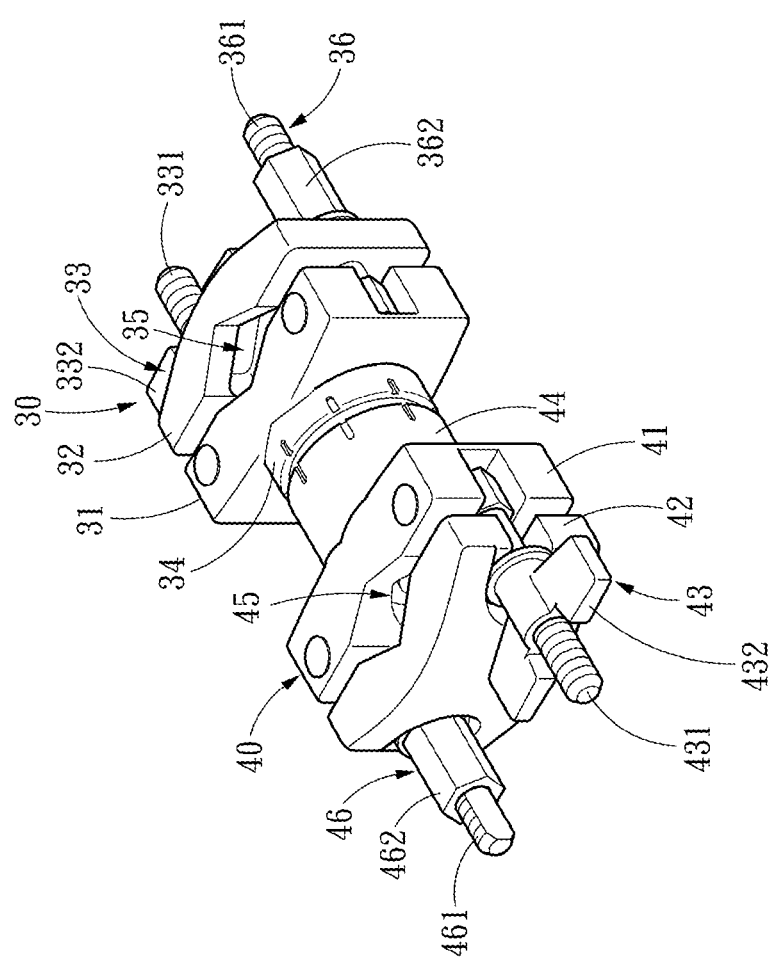
FIG. 1 is a perspective view of an exterior structure of the present invention.
Figure 2:
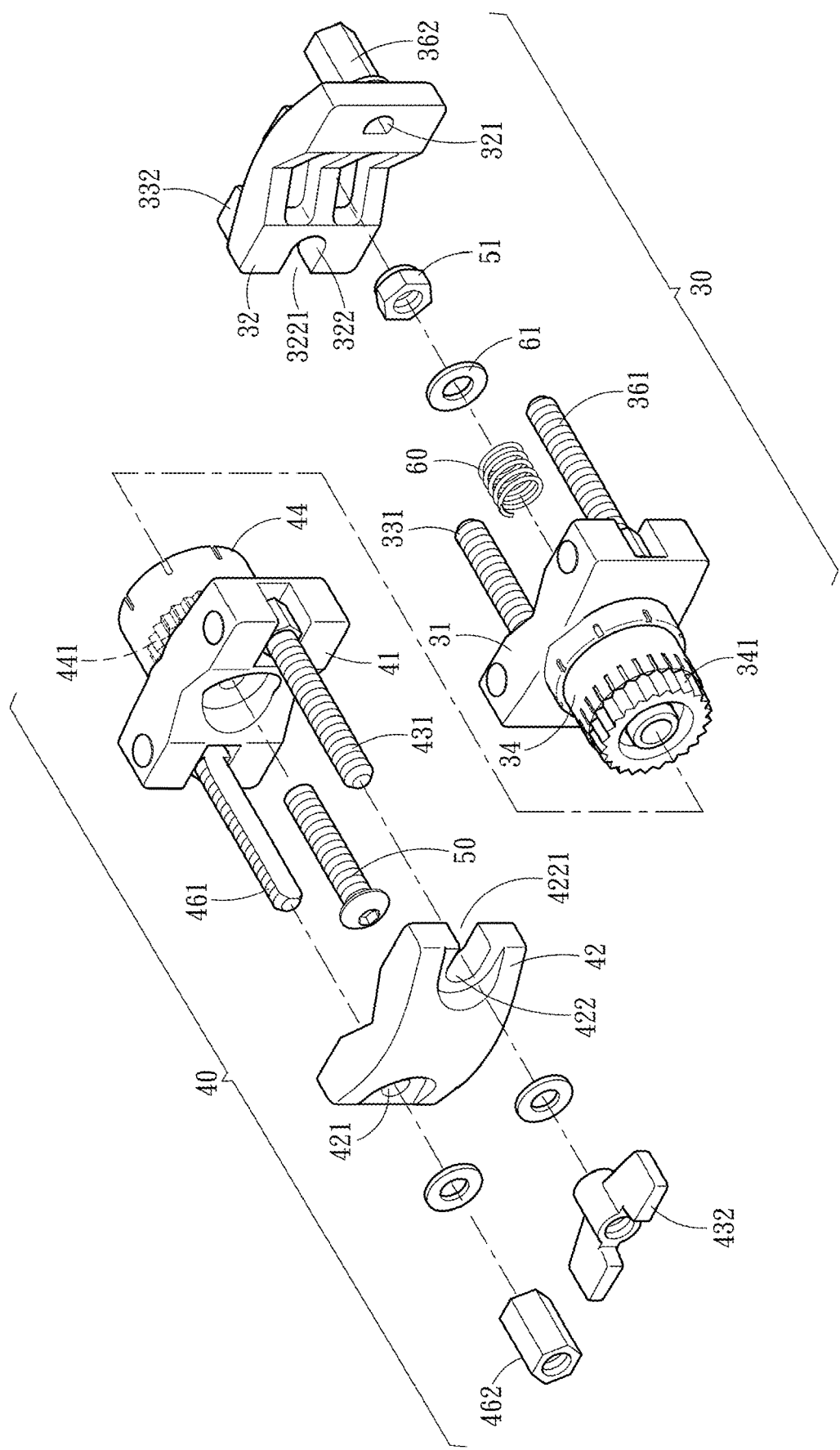
FIG. 2 is an exploded view of a structure of the present invention.

The technical contents, features and functions of the present invention will be clearly presented from the following detailed description of the preferred embodiments, taken in conjunction with the accompanying drawings.

Referring to FIG. 1, FIG. 2, FIG. 3 and FIG. 6, the present invention relates to an angle fixing clamp holder with simple steering operation for clamping a first erecting rod 10 and a second erecting rod 20. The angle fixing clamp holder with simple steering operation comprises a first fixture group 30, a second fixture group 40, a fixed bolt 50 and a compression spring 60, wherein the first fixture group 30 comprises a first fixed block 31, a first movable block 32, a first locking assembly 33 and a first cylindrical portion 34, and the first locking assembly 33 drives the first movable block 32 to move towards the first fixed block 31. In an actual structure, the first locking assembly 33 comprises a first bolt 331 and a first manually rotary knob 332, wherein the first bolt 331 is pivoted to the first fixed block 31 and penetrates through the first movable block 32, and the first manually rotary knob 332 is screwed to the first bolt 331 and pushes the first movable block 32 to move towards the first fixed block 31.

The first cylindrical portion 34 is connected with the first fixed block 31, surfaces of the first fixed block 31 and the first movable block 32 facing to each other are respectively recessed inwards to form a first clamping groove 35 through butt joint, and the first clamping groove 35 clamps the first erecting rod 10.

The first fixture group 30 may further comprise a first spacing adjusting assembly 36, the first spacing adjusting assembly 36 comprises a first non-circular bolt 361 and a first nut 362, the first non-circular bolt 361 is pivoted to the first fixed block 31 and penetrates through the first movable block 32, the first nut 362 is screwed to the first non-circular bolt 361 and pushes the first movable block 32 to move towards the first fixed block 31, the first movable block 32 comprises a first non-circular through hole 321 which is penetrated by the first non-circular bolt 361 and limits axial rotation of the first non-circular bolt 361 relative to the first non-circular through hole 321, and the first spacing adjusting assembly 36 and the first locking assembly 33 are respectively positioned on two sides of the first clamping groove 35. In addition, the first movable block 32 comprises a first open groove 322 which is penetrated by the first bolt 331, and one side, opposite to the first clamping groove 35, of the first open groove 322 is provided with a first side opening 3221.

The second fixture group 40 comprises a second fixed block 41, a second movable block 42, a second locking assembly 43 and a second cylindrical portion 44, wherein the second locking assembly 43 drives the second movable block 42 to move towards the second fixed block 41. In an actual structure, the second locking assembly 43 comprises a second bolt 431 and a second manually rotary knob 432, the second bolt 431 is pivoted to the second fixed block 41 and penetrates through the second movable block 42, and the second manually rotary knob 432 is screwed to the second bolt 431 and pushes the second movable block 42 to move towards the second fixed block 41.

Figure 3:
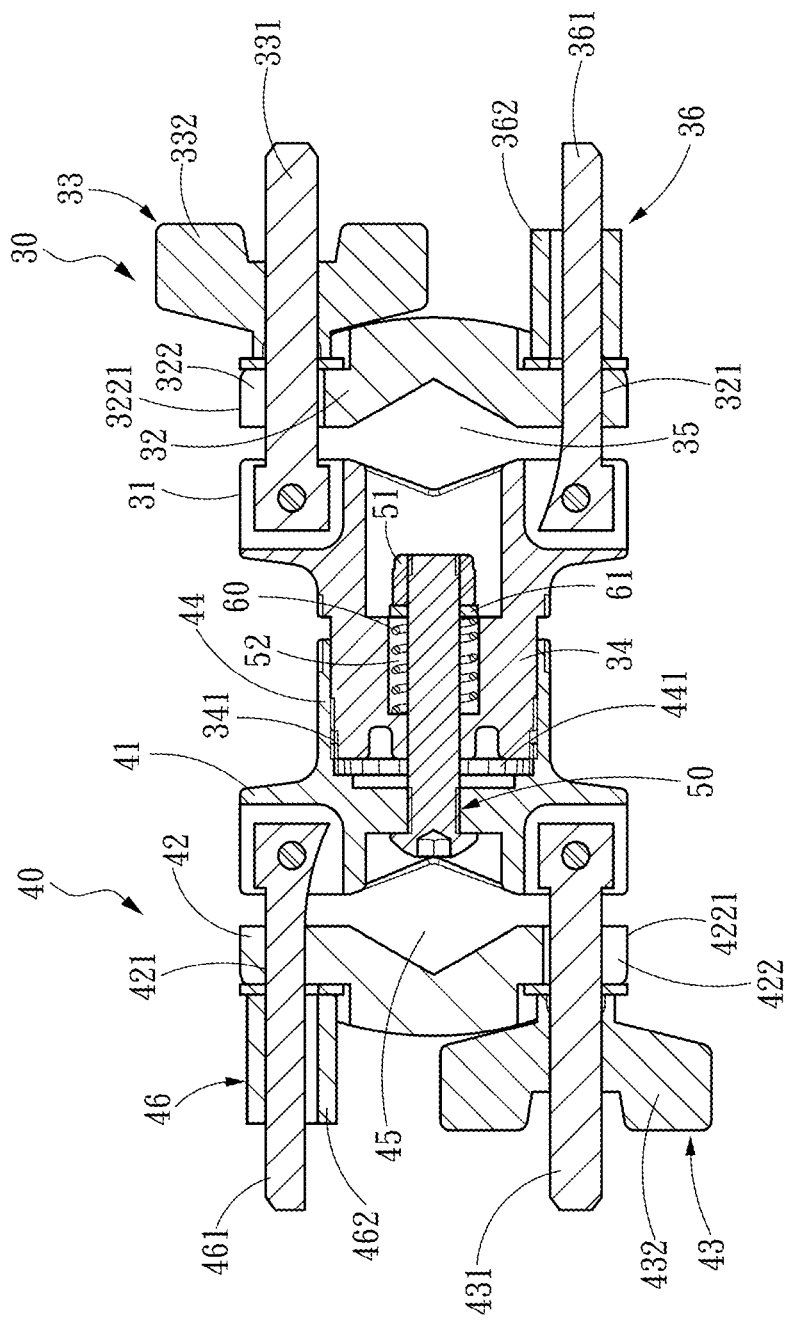
FIG. 3 is a cross-sectional view of the structure of the present invention.
Figure 4:
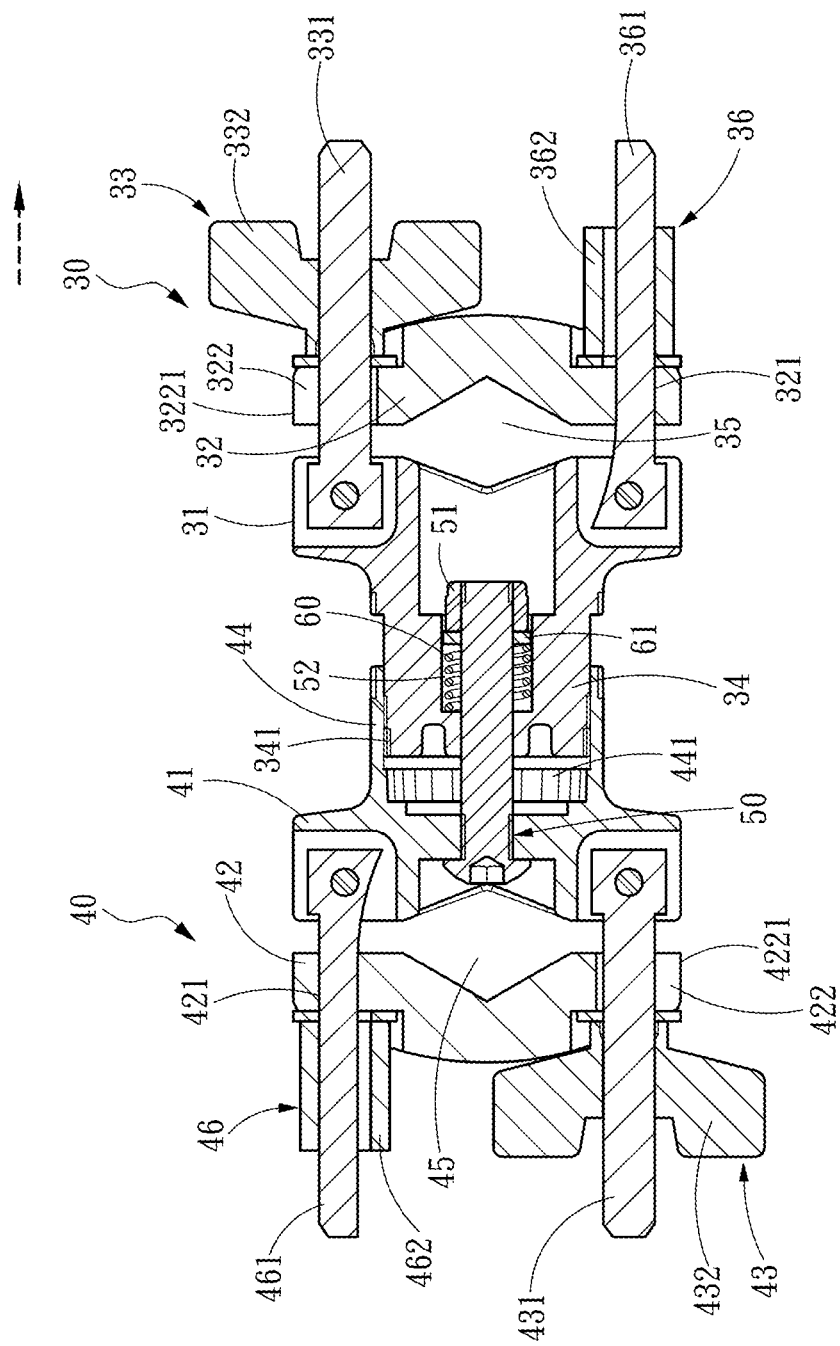
FIG. 4 is a cross-sectional view of the structure of the present invention in another state.

The second cylindrical portion 44 is connected with the second fixed block 41 and sleeved with the first cylindrical portion 34, surfaces of the second fixed block 41 and the second movable block 42 facing to each other are respectively recessed inwards to form a second clamping groove 45 through butt joint, and the second clamping groove 45 clamps the second erecting rod 20. The first cylindrical portion 34 axially slides relative to the second cylindrical portion 44 to be provided with a rotating position (as shown in FIG. 4) and a clamping position (as shown in FIG. 3). The first cylindrical portion 34 comprises a first non-circular axisymmetric profile 341, and the second cylindrical portion 44 comprises a second non-circular axisymmetric profile 441 correspondingly sleeved with the first non-circular axisymmetric profile 341. Preferably, the first non-circular axisymmetric profile 341 is an outer ratchet structure, and the second non-circular axisymmetric profile 441 is a corresponding inner ratchet structure. Moreover, when the first cylindrical portion 34 is in the rotating position, the first non-circular axisymmetric profile 341 is not in contact with the second non-circular axisymmetric profile 441, and the first cylindrical portion 34 has an axial rotation degree of freedom relative to the second cylindrical portion 44; and when the first cylindrical portion 34 is in the clamping position, the first non-circular axisymmetric profile 341 clamps the second non-circular axisymmetric profile 441, and the first cylindrical portion 34 does not have the axial rotation degree of freedom relative to the second cylindrical portion 44. Namely the first cylindrical portion 34 is able to freely rotate relative to the second cylindrical portion 44 in the rotating position, and the first cylindrical portion 34 is not able to freely rotate relative to the second cylindrical portion 44 in the clamping position.

The second fixture group 40 may further comprise a second spacing adjusting assembly 46, the second spacing adjusting assembly 46 comprises a second non-circular bolt 461 and a second nut 462. The second non-circular bolt 461 is pivoted to the second fixed block 41 and penetrates through the second movable block 42, and the second nut 462 is screwed to the second non-circular bolt 461 and pushes the second movable block 42 to move towards the second fixed block 41. The second movable block 42 comprises a second non-circular through hole 421 which is penetrated by the second non-circular bolt 461 and limits axial rotation of the second non-circular bolt 461 relative to the second non-circular through hole 421, and the second spacing adjusting assembly 46 and the second locking assembly 43 are respectively positioned on two sides of the second clamping groove 45. In addition, the second movable block 42 comprises a second open groove 422 which is penetrated by the second bolt 431, and one side, opposite to the second clamping groove 45, of the second open groove 422 is provided with a second side opening 4221.

The fixed bolt 50 penetrates through the first cylindrical portion 34 and the second cylindrical portion 44, and one end of the fixed bolt 50 clamped against the second cylindrical portion 44 and the other end of the fixed bolt 50 screwed with a nut 51, and an accommodating space 52 is formed between the nut 51 and the first cylindrical portion 34.

And the compression spring 60 is sleeved on the fixed bolt 50 and positioned in the accommodating space 52, the first cylindrical portion 34 is pushed by the compression spring 60 to move towards the second cylindrical portion 44 so that the first cylindrical portion 34 is able to move from the rotating position to the clamping position, the fixed bolt 50 may be further sleeved with a retaining ring 61 between the compression spring 60 and the nut 51, and the retaining ring 61 is clamped against the compression spring 60 to prevent the compression spring 60 from falling off.

Figure 5:
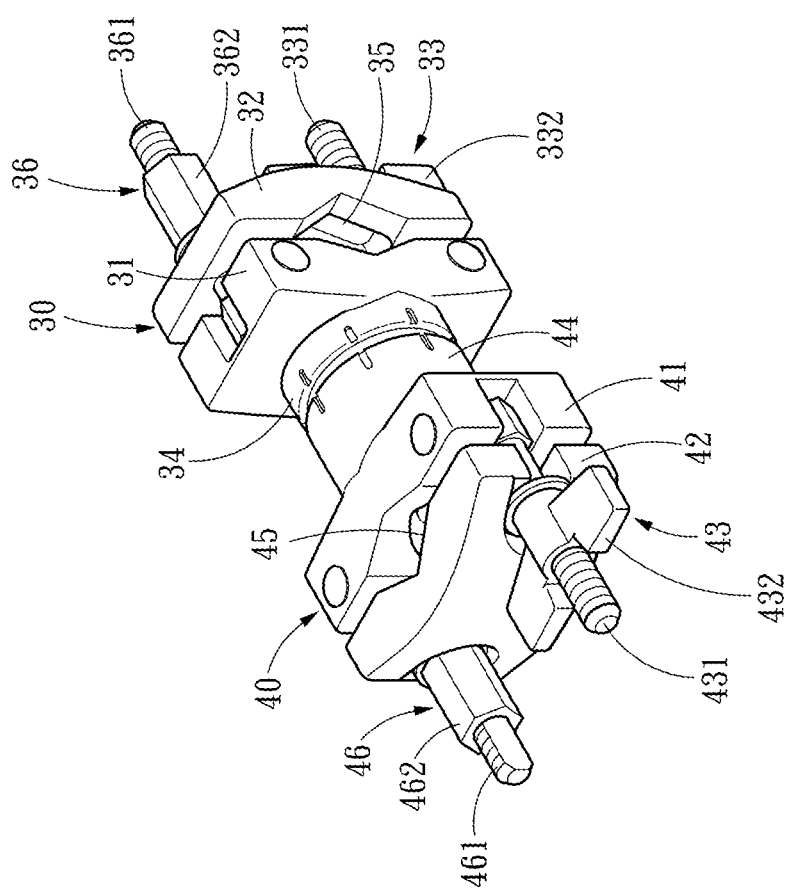
FIG. 5 is a perspective view of the exterior structure of the present invention after rotation.
Figure 6:
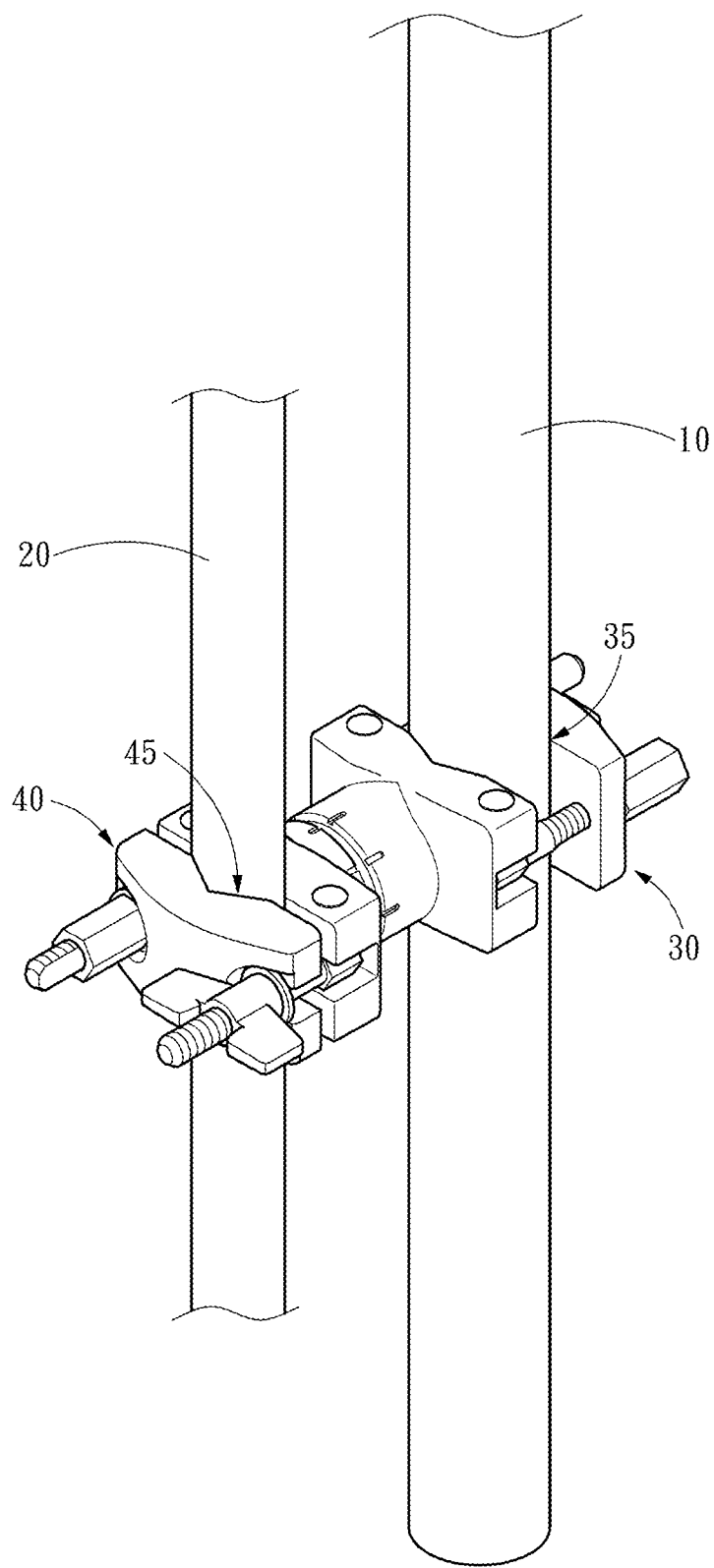
FIG. 6 is a schematic view of the present invention in use.

Referring again to FIG. 4, FIG. 5 and FIG. 6, when a user wants to change a relative inclination angle between the first erecting rod 10 and the second erecting rod 20, the user only needs to manually drive the first cylindrical portion 34 to axially slide relative to the second cylindrical portion 44, so that the first cylindrical portion 34 is able to compress the compression spring 60 to be in the rotating position (as shown in FIG. 4). Thus, the first cylindrical portion 34 has the axial rotation degree of freedom relative to the second cylindrical portion 44, namely the first fixture group 30 and the second fixture group 40 is able to rotate relative to each other (as shown in FIG. 5), and then the relative inclination angle between the first erecting rod 10 and the second erecting rod 20 is changed. When the relative inclination angle between the first erecting rod 10 and the second erecting rod 20 is changed to be the desired angle, the first cylindrical portion 34 is returned to the clamping position through a resilience of the compression spring 60, and a relative angle between the first fixture group 30 and the second fixture group 40 can be fixed.

As described above, the present invention has the following characteristics.

1. The first cylindrical portion is manually driven to axially slide relative to the second cylindrical portion, and the first fixture group can be rotated, so as to meet the use requirement of simple steering operation.

2. Through the resilience of the compression spring, the first cylindrical portion can be returned to the clamping position, so that the relative angle between the first fixture group and the second fixture group can be fixed, and the conventional problem of loosening of a screw is avoided simultaneously.

3. Through the design of the first and second side opening of the first and second open groove, the first movable block and the second movable block can be turned outwards only by loosening the first locking assembly and the second locking assembly, the first erecting rod and the second erecting rod can be quickly loosened, and the first spacing adjusting assembly and the second spacing adjusting assembly is used for adjusting distances between the first and second movable blocks and the first and second fixed blocks to conform to the first and second erecting rods of different sizes.

What is claimed is:

1. An angle fixing clamp holder with simple steering operation for clamping a first erecting rod and a second erecting rod, the angle fixing clamp holder comprising:
    a first fixture group, comprising a first fixed block, a first movable block, a first locking assembly for driving the first movable block to move towards the first fixed block, and a first cylindrical portion connected with the first fixed block, surfaces of the first fixed block and the first movable block facing to each other being respectively recessed inwards to form a first clamping groove for clamping the first erecting rod through butt joint, wherein the first locking assembly comprises a first bolt pivoted to the first fixed block and penetrating through the first movable block, and a first manually rotary knob screwed to the first bolt and pushing the first movable block to move towards the first fixed block, and wherein the first fixture group further comprises a first spacing adjusting assembly, the first spacing adjusting assembly comprises a first non-circular bolt pivoted to the first fixed block and penetrating through the first movable block, and a first nut screwed to the first non-circular bolt and pushing the first movable block to move towards the first fixed block, the first movable block comprises a first non-circular through hole which is penetrated by the first non-circular bolt and limits axial rotation of the first non-circular bolt, and the first spacing adjusting assembly and the first locking assembly are respectively positioned on two sides of the first clamping groove;
    a second fixture group, comprising a second fixed block, a second movable block, a second locking assembly for driving the second movable block to move towards the second fixed block, and a second cylindrical portion connected with the second fixed block and sleeved with the first cylindrical portion, surfaces of the second fixed block and the second movable block facing to each other being respectively recessed inwards to form a second clamping groove for clamping the second erecting rod through butt joint, the first cylindrical portion axially sliding relative to the second cylindrical portion to have a rotating position and a clamping position, the first cylindrical portion comprising a first non-circular axisymmetric profile, and the second cylindrical portion comprising a second non-circular axisymmetric profile correspondingly sleeved with the first non-circular axisymmetric profile, wherein when the first cylindrical portion is in the rotating position, the first non-circular axisymmetric profile is not in contact with the second non-circular axisymmetric profile, and the first cylindrical portion in the rotating position has an axial rotation degree of freedom relative to the second cylindrical portion; and when the first cylindrical portion is in the clamping position, the first non-circular axisymmetric profile clamps the second non-circular axisymmetric profile, and the first cylindrical portion in the clamping position does not have the axial rotation degree of freedom relative to the second cylindrical portion;
    a fixed bolt penetrating through the first cylindrical portion and the second cylindrical portion, and one end of the fixed bolt clamped against the second cylindrical portion and the other end of fixed bolt screwed with a nut, an accommodating space being formed between the nut and the first cylindrical portion; and
    a compression spring sleeved on the fixed bolt and positioned in the accommodating space, the first cylindrical portion being pushed by the compression spring to move towards the second cylindrical portion so as to enable the first cylindrical portion to move from the rotating position to the clamping position.

2. The angle fixing clamp holder of claim 1, wherein the first movable block comprises a first open groove which is penetrated by the first bolt, and one side, opposite to the first clamping groove, of the first open groove is provided with a first side opening.

3. The angle fixing clamp holder of claim 1, wherein the second locking assembly comprises a second bolt pivoted to the second fixed block and penetrating through the second movable block, and a second manually rotary knob screwed to the second bolt and pushing the second movable block to move towards the second fixed block.

4. The angle fixing clamp holder of claim 3, wherein the second fixture group further comprises a second spacing adjusting assembly, the second spacing adjusting assembly comprises a second non-circular bolt pivoted to the second fixed block and penetrating through the second movable block, and a second nut screwed to the second non-circular bolt and pushing the second movable block to move towards the second fixed block, the second movable block comprises a second non-circular through hole which is penetrated by the second non-circular bolt and limits axial rotation of the second non-circular bolt, and the second spacing adjusting assembly and the second locking assembly are respectively positioned on two sides of the second clamping groove.

5. The angle fixing clamp holder of claim 4, wherein the second movable block comprises a second open groove which is penetrated by the second bolt, and one side, opposite to the second clamping groove, of the second open groove is provided with a second side opening.

6. The angle fixing clamp holder of claim 1, wherein the fixed bolt is further sleeved with a retaining ring between the compression spring and the nut.

7. The angle fixing clamp holder of claim 1, wherein the first non-circular axisymmetric profile is an outer ratchet structure, and the second non-circular axisymmetric profile is a corresponding inner ratchet structure.

\* \* \* \* \*